(12) United States Patent
Tsuei

(10) Patent No.: US 10,222,661 B2
(45) Date of Patent: Mar. 5, 2019

(54) LIQUID CRYSTAL DISPLAY PANEL AND LIQUID CRYSTAL DISPLAY DEVICE

(71) Applicant: SHENZHEN CHINA STAR OPTOELECTRONICS TECHNOLOGY CO., LTD., Shenzhen (CN)

(72) Inventor: Bochin Tsuei, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 120 days.

(21) Appl. No.: 15/327,580

(22) PCT Filed: Jan. 6, 2017

(86) PCT No.: PCT/CN2017/070461
§ 371 (c)(1),
(2) Date: Jan. 19, 2017

(87) PCT Pub. No.: WO2018/113047
PCT Pub. Date: Jun. 28, 2018

(65) Prior Publication Data
US 2018/0217452 A1 Aug. 2, 2018

(30) Foreign Application Priority Data

Dec. 23, 2016 (CN) .......................... 2016 1 1208717

(51) Int. Cl.
*G02F 1/1343* (2006.01)

(52) U.S. Cl.
CPC .. *G02F 1/134309* (2013.01); *G02F 2201/121* (2013.01); *G02F 2201/123* (2013.01)

(58) Field of Classification Search
CPC ............. G02F 1/1337; G02F 1/133707; G02F 1/134309; G02F 1/134336; G02F 1/1343; G02F 1/1335; G02F 2001/134318; G09G 2300/0426; G09G 2300/0447; G06F 3/0412

See application file for complete search history.

(56) References Cited

U.S. PATENT DOCUMENTS 9,823,512 B2 * 11/2017 Chang ............... G02F 1/133707

* cited by examiner

*Primary Examiner* — Thoi Duong
(74) *Attorney, Agent, or Firm* — Kirton McConkie; Evan R. Witt

(57) ABSTRACT

The present disclosure provides a liquid crystal display (LCD) panel and an LCD device. The LCD panel includes a first substrate, a second substrate, and a liquid crystal layer. A plurality of pixel electrodes is arranged on the first substrate. Each of the plurality of pixel electrodes comprises one or more main electrode and two or more secondary electrodes connected to both sides of the main electrode. A common electrode is arranged on the second substrate. The common electrode and the pixel electrode are arranged opposite. A slot is arranged on the common electrode. The slot is arranged on an area of the common electrode which the main electrode is projected onto.

5 Claims, 3 Drawing Sheets

LIQUID CRYSTAL DISPLAY PANEL AND LIQUID CRYSTAL DISPLAY DEVICE

BACKGROUND

1. Field of the Disclosure

The present disclosure relates to the field of a liquid crystal display (LCD), and more particularly, to an LCD panel and an LCD device.

2. Description of the Related Art

A conventional LCD panel includes an array substrate, a color film substrate, and a liquid crystal layer. A patterned pixel electrode is arranged on the array substrate. Please refer to FIG. 1 illustrating a schematic diagram of a pixel electrode 101 and a common electrode 102 arranged on the conventional LCD panel. The pixel electrode 101 includes a main electrode 103 and a plurality of secondary electrodes 104 arranged on both sides of the main electrode 103. A slot 105 is sandwiched between the adjacent secondary electrodes 104 arranged at the same side. The LCD panel where the slot 105 produces an electric field and the common electrode 102 both control deflection of the liquid crystal to show images.

However, the electric field of the main electrode 103 is weaker than the slot area, and the area of the common electrode projected onto the main electrode 103 shows the same profile as the main electrode 103, which result in image sticking easily occurring on the main electrode 103 for the LCD panel. Moreover, the response speed of the main electrode 104 is slower than the other areas, which affects the display quality of the LCD panel.

Therefore, it is necessary to supply the industry with an LCD panel and an LCD device to solve existing and emerging problems in the related art.

SUMMARY

An object of the present disclosure is to propose a liquid crystal display (LCD) panel to eliminate image sticking, which is a drawback of the conventional LCD panel, and to enhance response speed to further improve the display quality of the LCD panel.

According to the present disclosure, a liquid crystal display (LCD) panel includes a first substrate, a second substrate, a liquid crystal layer sandwiched between the first substrate and the second substrate.

A plurality of pixel electrodes is arranged on the first substrate. Each of the plurality of pixel electrodes comprises one or more main electrode and two or more secondary electrodes connected to both sides of the main electrode. A common electrode is arranged on the second substrate. The common electrode and the pixel electrode are arranged opposite.

A slot is arranged on the common electrode. The slot is arranged on an area of the common electrode which the main electrode is projected onto. The slot is configured to control an electrode field better when liquid crystal is tilt.

The main electrode and the secondary electrodes are arranged on corresponding alignment areas. Each of the secondary electrodes comprises a terminal and a connecting end connected to the main electrode. An included angle formed between a direction of the terminal extending along the connecting end and an alignment of the alignment area ranges from 70 degrees to 85 degrees.

Optionally, the main electrode overlaps with the slot on the projection area of the common electrode.

Optionally, the slot comprises a first slot and two or more second slots extended to the both sides of the first slot.

Optionally, the first slot is parallel to and corresponds to the main electrode; the second slot is parallel to and corresponds to the secondary electrode arranged at the same side with the second slot.

Optionally, the width of the first slot is less than the width of the main electrode.

According to the present disclosure, a liquid crystal display (LCD) panel includes a first substrate, a second substrate, a liquid crystal layer sandwiched between the first substrate and the second substrate.

A plurality of pixel electrodes is arranged on the first substrate. Each of the plurality of pixel electrodes comprises one or more main electrode and two or more secondary electrodes connected to both sides of the main electrode. A common electrode is arranged on the second substrate. The common electrode and the pixel electrode are arranged opposite.

A slot is arranged on the common electrode. The slot is arranged on an area of the common electrode which the main electrode is projected onto. The slot is configured to control an electrode field better when liquid crystal is tilt.

Optionally, the main electrode overlaps with the slot on the projection area of the common electrode.

Optionally, the slot comprises a first slot and two or more second slots extended to the both sides of the first slot.

Optionally, the first slot is parallel to and corresponds to the main electrode; the second slot is parallel to and corresponds to the secondary electrode arranged at the same side with the second slot.

Optionally, the width of the first slot is less than the width of the main electrode.

According to the present disclosure, a liquid crystal display (LCD) device having an LCD panel and a backlight module is provided. The LCD panel includes a first substrate, a second substrate, a liquid crystal layer sandwiched between the first substrate and the second substrate. A plurality of pixel electrodes is arranged on the first substrate. Each of the plurality of pixel electrodes comprises one or more main electrode and two or more secondary electrodes connected to both sides of the main electrode. A common electrode is arranged on the second substrate. The common electrode and the pixel electrode are arranged opposite. A slot is arranged on the common electrode. The slot is arranged on an area of the common electrode which the main electrode is projected onto. The slot is configured to control an electrode field better when liquid crystal is tilt.

Optionally, the main electrode overlaps with the slot on the projection area of the common electrode.

Optionally, the slot comprises a first slot and two or more second slots extended to the both sides of the first slot.

Optionally, the first slot is parallel to and corresponds to the main electrode; the second slot is parallel to and corresponds to the secondary electrode arranged at the same side with the second slot.

Optionally, the width of the first slot is less than the width of the main electrode.

A slot is arranged on a common electrode and corresponds to a main electrode on the pixel electrode. the LCD panel and the common electrode both control the deflection of crystal liquid with the electric field over the slot at the both sides of the main electrode and the electric field over the slot on the common electrode. As a result, image sticking occurring on the main electrode is reduced while the response speed is enhanced, which further improves the display quality of the LCD panel.

These and other features, aspects and advantages of the present disclosure will become understood with reference to the following description, appended claims and accompanying figures.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
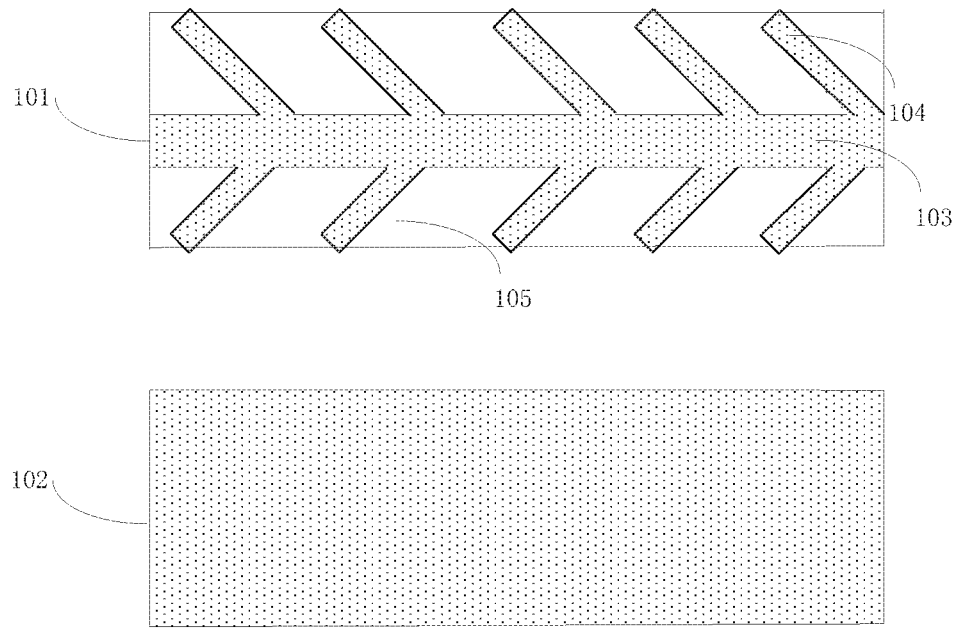
FIG. 1 illustrates a schematic diagram of a pixel electrode and a common electrode arranged on the conventional LCD panel.
Figure 2:
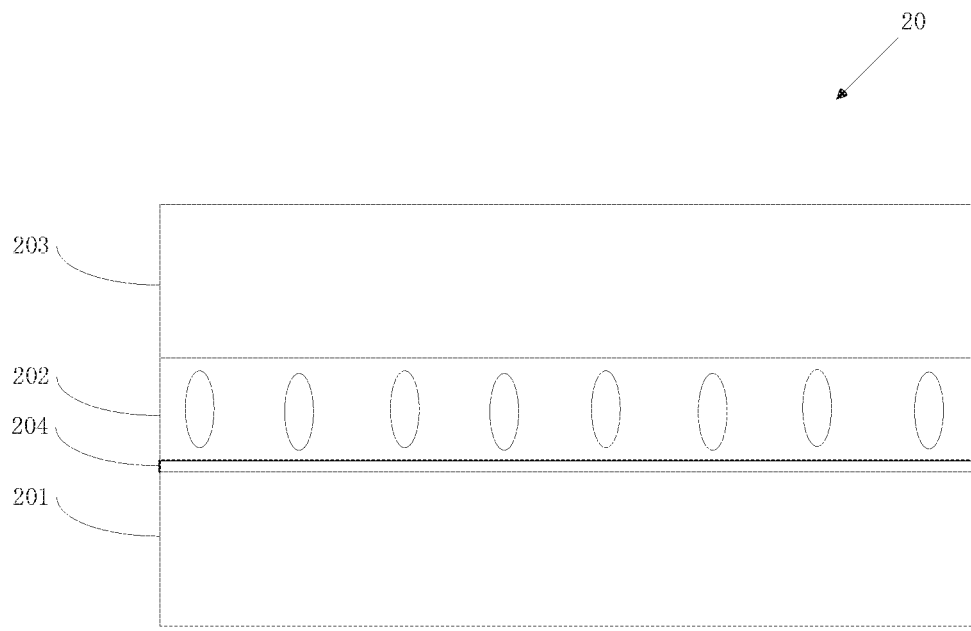
FIG. 2 illustrates a schematic diagram of a liquid crystal display (LCD) panel according to a first preferred embodiment of the present disclosure.

Please refer to FIG. 2 illustrating a schematic diagram of a liquid crystal display (LCD) panel 20 according to a first preferred embodiment of the present disclosure. The LCD panel 20 includes a first substrate 201, a second substrate 203, and a liquid crystal layer 202 sandwiched between the first substrate 201 and the second substrate 203. The first substrate 201 and the second substrate 203 may be made from transparent materials such as glass, quartz or the like, plastics, rubber, glass fiber, or other polymer materials. Or, the first substrate 201 and the second substrate 203 may be made from opaque materials such as a metal-glass fiber composite plate, a metal-china composite plate, a printed circuit board (PCB), or other materials. Take the first substrate 201 and the second substrate 203 made from transparent glass for example. In addition, the LCD panel further includes a thin-film transistor (TFT) array and a color filer array (not shown). The TFT array is arranged on one side of the first substrate 201 and the side faces the second substrate 203. The color filer array may be arranged on one side of the second substrate 203 and the side faces the first substrate 201. Or, the color filer array may be arranged on one side of the first substrate 201 and the side faces the second substrate 203. The TFT array is arranged on the first substrate 201 (or called "TFT substrate"), and the color filer array is arranged on the second substrate 203 (or called "color filer substrate"). However, when one filter layer (such as red R, green G, and blue B) of the color filer array is arranged on the first substrate 201, the first substrate 201 becomes a color filter on array (COA) substrate. When one black matrix of the color filer array is arranged on the first substrate 201, the first substrate 201 becomes a BM on array (BOA) substrate.

A plurality of pixel electrodes are arranged on the first substrate 201. A pixel electrode may be a transparent electrode layer 204. The material of the pixel electrode may be transparent conductive materials such as indium tin oxide (ITO), indium zinc oxide (IZO), aluminum-doped zinc oxide (AZO), cadmium tin oxide (CTO), tin oxide (SnO2), and zinc oxide (ZnO).

Figure 3:
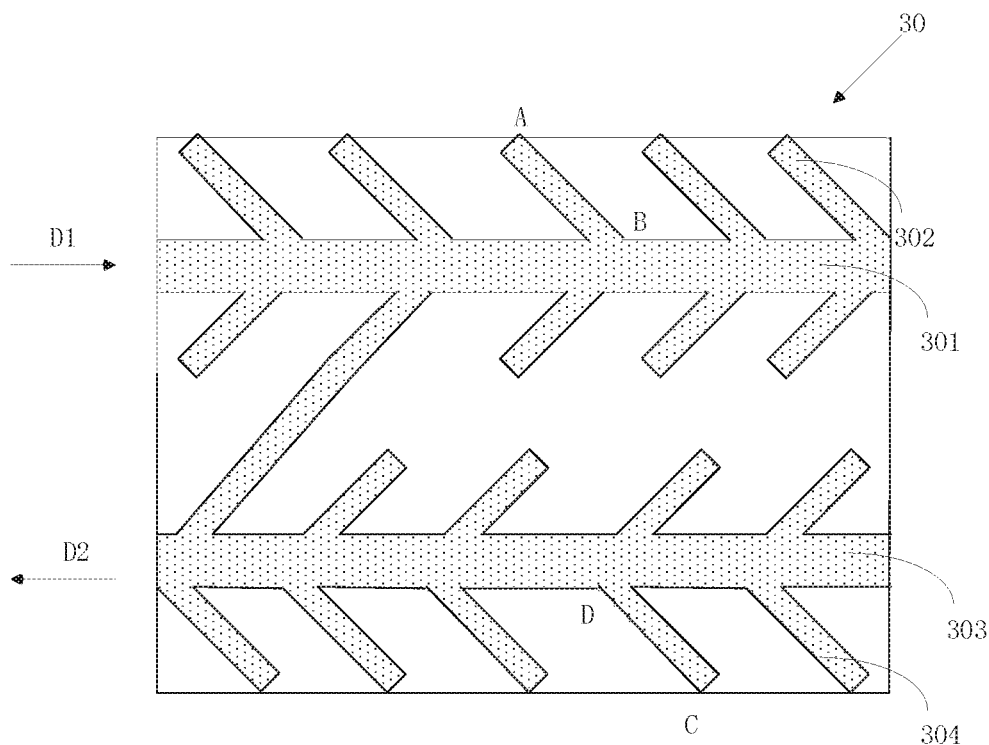
FIG. 3 illustrates a schematic diagram of the pixel electrode of the LCD panel according to the first preferred embodiment of the present disclosure.

Please refer to FIG. 3 illustrating a schematic diagram of the pixel electrode of the LCD panel according to the first preferred embodiment of the present disclosure.

The pixel electrode includes one or more main electrode and two or more secondary electrodes connected to both sides of the main electrode. The pixel electrode 30 includes a first main electrode 301 arranged on a first alignment area and two or more first secondary electrodes 302 connected to both sides of the first main electrode 301. The plurality of first secondary electrodes 302 are used. The alignment of the first alignment area is set as D1. The alignment D1 is left to right.

The pixel electrode 30 further includes a second main electrode 303 arranged on a second alignment area and two or more second secondary electrodes 304 connected to both sides of the second main electrode 303. The plurality of second secondary electrodes 304 are used. The alignment of the second alignment area is set as D2. The alignment D2 is right to left, which is reverse to D1. In addition, one of the plurality of first secondary electrodes 302 on the first alignment area is connected to one of the plurality of second secondary electrodes 304 on the second alignment area. After the signal is transmitted to the first alignment area, a voltage imposed on the first secondary electrode 302 on the first alignment area is the same as a voltage imposed on the second secondary electrode 304 on the second alignment area.

In this preferred embodiment, the first secondary electrode 302 includes a terminal A and a connecting end B connected to the first main electrode 301. An included angle formed between the direction of the terminal A extending along the connecting end B and the alignment D1 of the first alignment area ranges from 70 degrees to 85 degrees. Also, the second secondary electrode 304 includes a terminal C and a connecting end D connected to the second main electrode 303. An included angle formed between the direction of the terminal C extending along the connecting end D and the alignment D2 of the first alignment area ranges from 70 degrees to 85 degrees.

The first main electrode 301 and the second main electrode 303 are arranged parallel. One of the first secondary electrodes 302 and one of the second secondary electrodes 304 are arranged parallel. The first secondary electrodes 302 on the upper side of the first main electrode 301 are in parallel and arranged at intervals. The first secondary electrodes 302 on the lower side of the first main electrode 301 are in parallel and arranged at intervals. In other words, slots are sandwiched between the adjacent first secondary electrodes 302 on the same side. The second secondary electrodes 304 on the upper side of the second main electrode 303 are in parallel and arranged at intervals. The second secondary electrodes 304 on the lower side of the second main electrode 303 are in parallel and arranged at intervals.

In other words, slots are sandwiched between the adjacent second secondary electrodes 304 on the same side.

Figure 4:
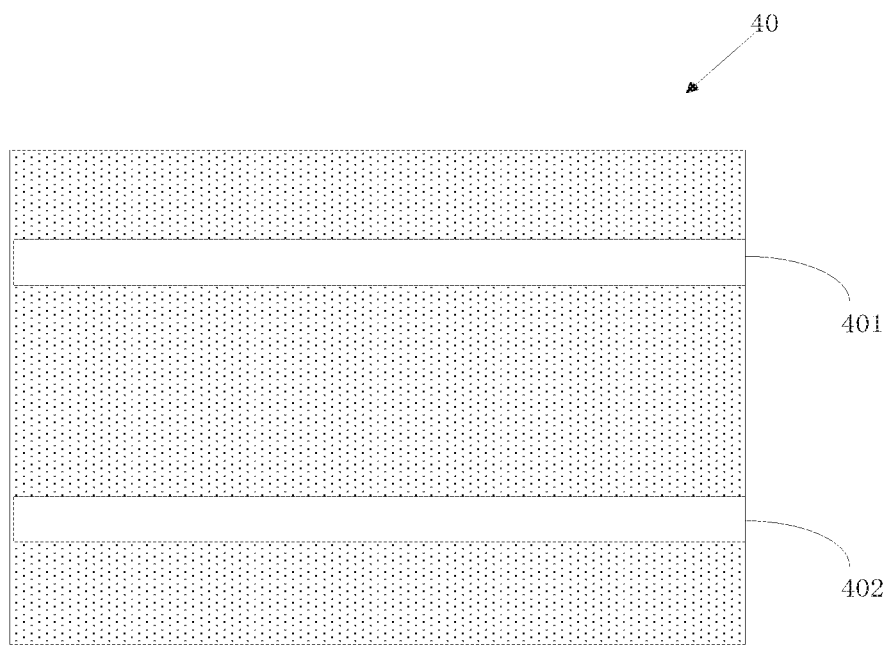
FIG. 4 illustrates a schematic diagram of a common electrode of the LCD panel according to the first preferred embodiment of the present disclosure.

Please refer to FIG. 3 and FIG. 4 illustrating a schematic diagram of a common electrode of the LCD panel according to the first preferred embodiment of the present disclosure.

The common electrode 40 and the pixel electrode are arranged opposite. A first slot 401 is arranged on the common electrode 40 corresponding to the first main electrode 301. A second slot 402 is arranged on the common electrode 40 corresponding to the second main electrode 303. The first slot 401 and the first main electrode 301 are projected onto the common electrode 40 and the projections completely overlap. The second slot 402 and the second main electrode 303 are projected onto the common electrode 40 and the projections completely overlap. Because of the electric field over the slot at the both sides of the main first electrode 301 of the common electrode 30, the electric field over the slot at the both sides of the main second electrode 303 of the common electrode 30, the electric field produced by the first slot 401 and the second slot 402, the deflection of crystal liquid is controlled. As a result, image sticking occurring on the main first electrode 301 and the main second electrode 303 is reduced while the response speed is enhanced, which further improves the display quality of the LCD panel.

According to the preferred embodiment of the present disclosure, the LCD panel and the common electrode both control the deflection of crystal liquid with the electric field over the slot at the both sides of the main electrode and the electric field over the slot on the common electrode. As a result, image sticking occurring on the main electrode is reduced while the response speed is enhanced, which further improves the display quality of the LCD panel.

Figure 5:
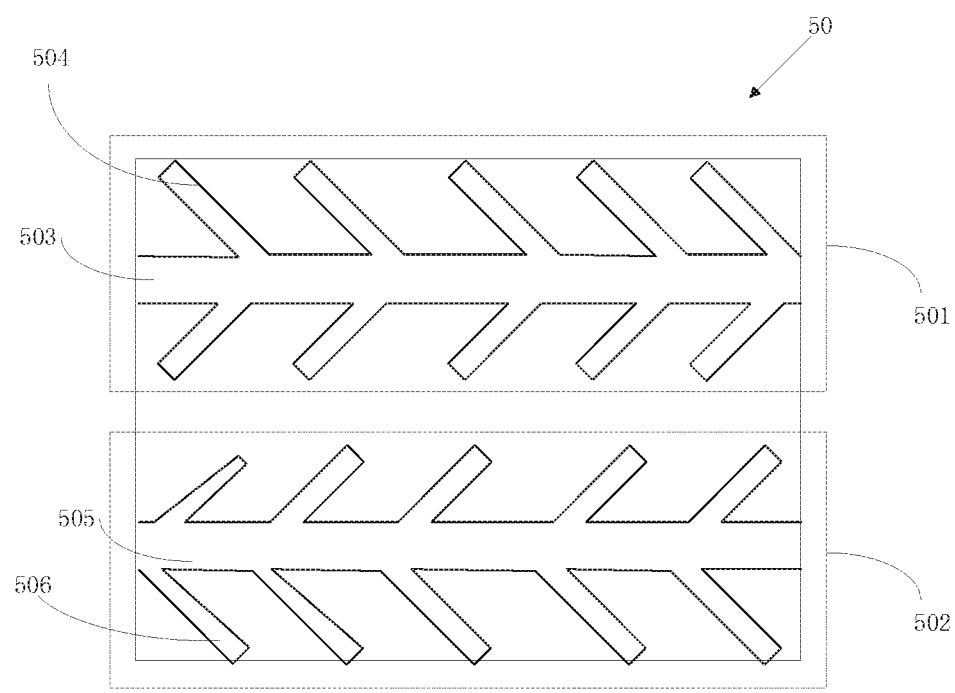
FIG. 5 illustrates a schematic diagram of a common electrode of a liquid crystal display (LCD) panel according to a second preferred embodiment of the present disclosure.

Please refer to FIG. 5 illustrating a schematic diagram of a common electrode of a liquid crystal display (LCD) panel according to a second preferred embodiment of the present disclosure.

The difference between the second embodiment and the first embodiment is that the width of the first main electrode and the width of the second main electrode are larger in the second embodiment than the first embodiment. Except for the width, the other devices used in the first embodiment are similar to those used in the second embodiment. The details of the devices for the pixel electrode can refer to the descriptions for the first embodiment.

The width of the first main electrode and the second main electrode is larger. If the slots corresponding to the first main electrode and the second main electrode are arranged on the common electrode, how the liquid crystal is deflected is affected. To cope with this condition, the preferred embodiment of the present disclosure proposes another method of arranging the slots on the common electrode.

Please refer to FIG. 3 and FIG. 5. The common electrode 50 and the pixel electrode are arranged opposite. Likewise, a slot is arranged on each of the first main electrode 301 and the second electrode 303 facing an area 501 and an area 502 on the common electrode 50 opposite. Specifically, the first main electrode 301 facing the area 501 on the common electrode 50 opposite includes a first slot 503 and two or more second slots 504 connected to both sides of the first slot 503. The first slot 503 is in parallel to the first main electrode 301. The second slots 504 are in parallel to the first secondary electrodes 302 correspondingly, which are arranged on the same side with the second slots 504. The width of the first slot 503 is less than the first main electrode 301.

The second main electrode 303 facing the area 502 on the common electrode 50 opposite includes a first slot 505 and two or more second slots 506 connected to both sides of the first slot 505. The first slot 505 is in parallel to the second main electrode 303. The second slots 506 are in parallel to the second secondary electrodes 304 correspondingly, which are arranged on the same side with the second slots 506. The width of the first slot 505 is less than the second main electrode 303.

According to the preferred embodiment of the present disclosure, the LCD panel and the common electrode both control the deflection of crystal liquid with the electric field over the slot at the both sides of the main electrode and the electric field over the slot on the common electrode. As a result, image sticking occurring on the main electrode is reduced while the response speed is enhanced, which further improves the display quality of the LCD panel.

The present disclosure further proposes a liquid crystal display (LCD) device having an LCD panel and a backlight module. The LCD panel includes a first substrate, a second substrate, a liquid crystal layer sandwiched between the first substrate and the second substrate. A plurality of pixel electrodes is arranged on the first substrate. Each of the plurality of pixel electrodes comprises one or more main electrode and two or more secondary electrodes connected to both sides of the main electrode. A common electrode is arranged on the second substrate. The common electrode and the pixel electrode are arranged opposite. A slot is arranged on the common electrode. The slot is arranged on an area of the common electrode which the main electrode is projected onto. The slot is configured to control an electrode field better when liquid crystal is tilt.

Preferably, the main electrode overlaps with the slot on the projection area of the common electrode.

Preferably, the slot comprises a first slot and two or more second slots extended to the both sides of the first slot. The first slot is parallel to and corresponds to the main electrode; the second slot is parallel to and corresponds to the secondary electrode arranged at the same side with the second slot. The width of the first slot is less than the width of the main electrode.

The operating principle and concrete structure of the LCD device proposed by the second embodiment is the same as or similar to the operating principle and concrete structure of the LCD device proposed by the first embodiment. So the details can refer to the first embodiment.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A liquid crystal display (LCD) panel, comprising: a first substrate, a second substrate, a liquid crystal layer sandwiched between the first substrate and the second substrate;
a plurality of pixel electrodes arranged on the first substrate; each of the plurality of pixel electrodes comprising one or more main electrode and two or more secondary electrodes connected to both sides of the main electrode; a common electrode arranged on the second substrate; the common electrode and the pixel electrode arranged opposite;

wherein a slot is arranged on the common electrode; the slot is arranged on an area of the common electrode which the main electrode is projected onto; the slot is configured to control an electrode field better when liquid crystal is tilt;

the main electrode and the secondary electrodes are arranged on corresponding alignment areas; each of the secondary electrodes comprises a terminal and a connecting end connected to the main electrode; an inclined angle formed between a direction of the terminal extending along the connecting end and an alignment of the alignment area ranges from 70 degrees to 85 degrees.

2. The LCD panel of claim 1, wherein the main electrode overlaps with the slot on the projection area of the common electrode.

3. The LCD panel of claim 1, wherein the slot comprises a first slot and two or more second slots extended to the both sides of the first slot.

4. The LCD panel of claim 3, wherein the first slot is parallel to and corresponds to the main electrode; the second slot is parallel to and corresponds to the secondary electrode arranged at the same side with the second slot.

5. The LCD panel of claim 4, wherein a width of the first slot is less than a width of the main electrode.

* * * * *